(12) United States Patent
Dai et al.

(10) Patent No.: US 11,895,617 B2
(45) Date of Patent: Feb. 6, 2024

(54) MESSAGE IDENTIFICATION METHOD AND APPARATUS

(71) Applicant: HUAWEI TECHNOLOGIES CO., LTD., Guangdong (CN)

(72) Inventors: Mingzeng Dai, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,344

(22) Filed: Mar. 29, 2019

(65) Prior Publication Data
US 2019/0230621 A1 Jul. 25, 2019

Related U.S. Application Data

(63) Continuation of application No. PCT/CN2017/102205, filed on Sep. 19, 2017.

(30) Foreign Application Priority Data

Sep. 30, 2016 (CN) .......................... 201610874215.5

(51) Int. Cl.
*H04W 68/00* (2009.01)
*H04W 88/02* (2009.01)
(Continued)

(52) U.S. Cl.
CPC ......... *H04W 68/005* (2013.01); *H04W 36/00* (2013.01); *H04W 76/11* (2018.02); *H04W 76/27* (2018.02); *H04W 88/023* (2013.01)

(58) Field of Classification Search
None
See application file for complete search history.

(56) References Cited

U.S. PATENT DOCUMENTS 10,111,104 B2 * 10/2018 Kim ...................... H04W 24/02
10,582,522 B2 * 3/2020 Cho ..................... H04W 12/062
(Continued)

FOREIGN PATENT DOCUMENTS

CN 101018417 A 8/2007
CN 101188862 A 5/2008
(Continued)

OTHER PUBLICATIONS

"Network selection and NAS routingfor eLTE," 3GPP TSG-RAN WG2 Meeting AH, R2-1700307, Spokane, US, pp. 1-3, 3rd Generation Partnership Project—Valbonne, France (Jan. 17-19, 2017).

(Continued)

*Primary Examiner* — Mariela Vidal Carpio
(74) *Attorney, Agent, or Firm* — Leydig, Voit & Mayer, Ltd.

(57) ABSTRACT

Embodiments of this application provide a message identification method and apparatus. The method includes: receiving, by user equipment UE, a paging message sent by an access network device; determining, by the UE, a core network entity to which the paging message belongs in a plurality of core network entities serving the UE; and establishing, by the UE, a data connection to the core network entity to which the paging message belongs. According to the message identification method and apparatus provided in the embodiments of this application, the UE can connect to different core network entities.

9 Claims, 6 Drawing Sheets

UE receives a paging message sent by an access network device — 101

The UE determines a core network entity to which the paging message belongs in a plurality of core network entities serving the UE — 102

The UE establishes a data connection to the core network entity to which the paging message belongs — 103

(51) Int. Cl.
*H04W 76/27* (2018.01)
*H04W 76/11* (2018.01)
*H04W 36/00* (2009.01)

(56) References Cited

U.S. PATENT DOCUMENTS

| | | | | |
|---|---|---|---|---|
| 10,932,253 | B2* | 2/2021 | Centonza | H04W 72/0426 |
| 11,026,142 | B2* | 6/2021 | Kubota | H04W 36/165 |
| 11,051,278 | B2* | 6/2021 | Tie | H04W 74/0833 |
| 2005/0266846 | A1* | 12/2005 | Kim | H04W 28/06 |
| | | | | 455/436 |
| 2006/0040681 | A1 | 2/2006 | Julka et al. | |
| 2010/0099402 | A1* | 4/2010 | Wu | H04W 76/18 |
| | | | | 455/423 |
| 2010/0296421 | A1* | 11/2010 | Watfa | H04W 76/18 |
| | | | | 370/310 |
| 2012/0307797 | A1 | 12/2012 | Yuan et al. | |
| 2013/0217423 | A1 | 8/2013 | He et al. | |
| 2014/0099912 | A1* | 4/2014 | Lee | H04W 48/08 |
| | | | | 455/404.1 |
| 2016/0135141 | A1* | 5/2016 | Burbidge | H04W 68/02 |
| | | | | 455/458 |
| 2017/0332212 | A1* | 11/2017 | Gage | H04L 41/5041 |
| 2018/0249513 | A1* | 8/2018 | Chang | H04W 48/14 |
| 2019/0029000 | A1* | 1/2019 | Vikberg | H04W 76/10 |
| 2019/0110243 | A1* | 4/2019 | Chun | H04W 76/10 |
| 2019/0159024 | A1* | 5/2019 | Rost | H04W 12/69 |

FOREIGN PATENT DOCUMENTS

| | | |
|---|---|---|
| CN | 101257707 A | 9/2008 |
| CN | 101500281 A | 8/2009 |
| CN | 102421167 A | 4/2012 |
| CN | 102457825 A | 5/2012 |
| CN | 102763372 A | 10/2012 |
| WO | 02082824 A2 | 10/2002 |
| WO | 2008048158 A1 | 4/2008 |
| WO | 2014148990 A1 | 9/2014 |
| WO | 2017135859 A1 | 8/2017 |
| WO | WO-2017135859 A1 * | 8/2017 ............ H04W 48/18 |

OTHER PUBLICATIONS

"3rd Generation Partnership Project; Technical Specification Group Services and System Aspects; Enhancements of Dedicated Core Networks selection mechanism (Release 14)," 3GPP TR 23.711 V14.0.0, pp. 1-36, 3rd Generation Partnership Project—Valbonne, France (Sep. 2016).
International Search Report, dated Dec. 25, 2017, in International Application No. PCT/CN2017/102205 (5 pp.).
International Search Report dated Dec. 25, 2017 in corresponding International Patent Application No. PCT/CN2017/102205.
Written Opinion of the International Searching Authority dated Dec. 25, 2017 in corresponding International Patent Application No. PCT/CN2017/102205.
Motorola, "Network Node Identification," TSG-SA WG2, lu Flex drafting meeting, Düsseldorf, Germany, S2-luFlex-009, total 1 page (Apr. 19-20, 2001).
Ericsson, "Elaboration of flow details in procedure S1-based handover," 3GPP TSG-SA2 Meeting #67, Sophia Antipolis, France, S2-086096, total 8 pages (Aug. 25-29, 2008).

* cited by examiner

```
┌─────────────────────────────────────────────────┐
│ A base station receives first security configuration
│ information sent by a first core network entity and
│ second security configuration information sent by a
│ second core network entity, and determines target      ┌─ 1001
│ security configuration information in the first security
│ configuration information and the second security
│ configuration information according to a security rule
└─────────────────────────────────────────────────┘
                        │
                        ▼
┌─────────────────────────────────────────────────┐
│ The base station performs encryption/decryption or
│ integrity protection/check on an RRC message based     ┌─ 1002
│ on the target security configuration information
└─────────────────────────────────────────────────┘
                        │
                        ▼
┌─────────────────────────────────────────────────┐
│ The base station sends the target security configuration
│ information to UE, so that the UE performs
│ encryption/decryption or integrity protection/check on ┌─ 1003
│ the RRC message based on the target security
│ configuration information
└─────────────────────────────────────────────────┘
```

MESSAGE IDENTIFICATION METHOD AND APPARATUS

CROSS-REFERENCE TO RELATED APPLICATIONS

This application is a continuation of International Application No. PCT/CN2017/102205, filed on Sep. 19, 2017, which claims priority to Chinese Patent Application No. 201610874215.5, filed on Sep. 30, 2016. The disclosures of the aforementioned applications are hereby incorporated by reference in their entireties.

TECHNICAL FIELD

Embodiments of this application relate to communications technologies, and in particular, to a message identification method and apparatus.

BACKGROUND

A 4th generation mobile communications technology (the 4th Generation mobile communications technology, 4G for short) network includes an evolved NodeB (evolved NodeB, eNB for short) and an evolved packet core (Evolved Packet Core, EPC for short). The EPC includes a mobility management entity (Mobility Management Entity, MME for short), a serving gateway (Serving Gateway, SGW for short), and the like.

To satisfy requirements such as a higher rate, a lower delay, and a greater service diversity, the 3rd Generation Partnership Project (3rd Generation Partnership Project, 3GPP for short) is defining the 5th generation mobile communications technology (the 5th Generation mobile communications technology, 5G for short). In 5G, a new core network, namely, a next generation core (Next Generation Core, NG-Core for short) will be introduced. Compared with the EPC, in the NG-Core, more new functions are introduced, such as supporting a network slice (Network slicing) and a flow-based QoS mechanism.

In an existing Long Term Evolution (Long Term Evolution, LTE for short) network, an evolved NodeB eNB connects to an EPC. In a process of smoothly evolving to the 5G network, the LTE network evolves to an evolved LTE (evolved LTE, eLTE for short) network. In the eLTE network, an evolved NodeB eNB connects to both an EPC and an NG-Core. This can ensure that users relatively early use a new service brought by the NG-Core while ensuring backward compatibility. The NG-Core includes a plurality of entities, for example, includes a mobility management (Mobility Management, MM for short) entity and a session management (session management, SM for short) entity. In addition, different types of sessions may be separately provided in a plurality of SM entities in the NG-Core. In addition, the NG-Core supports network slicing, and one user equipment (User Equipment, UE for short) can access a plurality of network slices.

In the current LTE system, user equipment (User Equipment, UE for short) can access only one core network (the EPC). In the eLTE network, UE can access two core networks (namely, the EPC and the NG-Core), and in a 5G NR network, UE can access a plurality of core network entities or network slices switching. After the NG-Core is introduced into 5G, how to connect UE to different core network entities is a technical problem to be resolved in this application.

SUMMARY

Embodiments of this application provide a message identification method and apparatus, so that UE can connect to different core network entities.

According to a first aspect, an embodiment of this application provides a message identification method, including:
  receiving, by user equipment UE, a paging message sent by an access network device;
  determining, by the UE, a core network entity to which the paging message belongs in a plurality of core network entities serving the UE; and
  establishing, by the UE, a data connection to the core network entity to which the paging message belongs.

According to the message identification method provided in the first aspect, the UE receives the paging message sent by the access network device, determines the core network entity to which the paging message belongs in the plurality of core network entities serving the UE, and establishes the data connection to the core network entity to which the paging message belongs. Because the UE can determine the core network entity to which the paging message belongs in the plurality of core network entities serving the UE, and establish the data connection to the core network entity to which the paging message belongs, the UE can be effectively supported in accessing different core network entities.

In a possible design, the plurality of core network entities are located in different network standards.

In a possible design, the paging message carries identification information, and the identification information is used to determine the core network entity to which the paging message belongs.

In a possible design, the identification information includes type identification information of the core network entity to which the paging message belongs.

In a possible design, the identification information includes device identification information of UE in the core network entity to which the paging message belongs.

In a possible design, the identification information includes a time-frequency resource corresponding to the core network entity to which the paging message belongs.

According to the message identification method provided in the foregoing possible designs, the core network entity to which the paging message belongs can be identified based on the type identification information of the core network entity to which the paging message belongs, the device identification information of the UE in the core network entity to which the paging message belongs, or the time-frequency resource corresponding to the core network entity to which the paging message belongs. In this way, manners of determining the core network entity to which the paging message belongs can be relatively flexible and diverse.

In a possible design, the establishing, by the UE, a data connection to the core network entity to which the paging message belongs includes:
  sending, by the UE, the paging message to a NAS to which the paging message belongs;
  receiving, by the UE, a NAS message sent by the NAS; and
  sending, by the UE, the NAS message to the core network entity to which the paging message belongs.

According to the message identification method provided in the foregoing possible designs, the paging message is sent to the NAS to which the paging message belongs, the NAS message sent by the NAS is received, and the NAS message is returned to a base station. In this way, the UE can be effectively supported in accessing different core network entities.

According to a second aspect, an embodiment of this application provides a message identification method, including:

sending, by an access network device, a paging message to user equipment UE;

receiving, by the access network device, a NAS message sent by the UE based on the paging message;

determining, by the access network device, a core network entity to which the NAS message belongs in a plurality of core network entities of the access network device; and sending, by the access network device, the NAS message to the core network entity to which the NAS message belongs.

According to the message identification method provided in the second aspect, the access network device sends the paging message to the UE, receives the NAS message sent by the UE based on the paging message, determines the core network entity to which the NAS message belongs in the plurality of core network entities of the access network device, and sends the NAS message to the core network entity to which the NAS message belongs. Because the access network device determines the core network entity to which the NAS message belongs in the plurality of core network entities of the access network device, and sends the NAS message to the corresponding core network entity, the UE can be effectively supported in accessing different core network entities.

In a possible design, the determining, by the access network device, a core network entity to which the NAS message belongs in a plurality of core network entities of the access network device includes:

receiving, by the access network device, a radio resource management RRC message sent by the UE, where the RRC message is used to transfer the NAS message, and the RRC includes a type identifier of the core network entity to which the NAS message belongs; and determining, by the access network device based on the type identifier, the core network entity to which the NAS message belongs in the plurality of core network entities of the access network device.

In a possible design, the determining, by the access network device, a core network entity to which the NAS message belongs in a plurality of core network entities of the access network device includes:

receiving an RRC message, and determining a logical channel used when the RRC message is transferred, where the RRC message is used to transfer the NAS message; and determining, based on a mapping relationship between the logical channel and a core network entity, the core network entity corresponding to the logical channel.

According to the message identification method provided in the foregoing possible designs, the core network entity to which the NAS message belongs can be determined based on the type identifier of the core network entity to which the NAS message belongs or the mapping relationship between the logical channel and the core network entity. In this way, manners of determining the core network entity to which the NAS message belongs can be relatively flexible.

According to a third aspect, an embodiment of this application provides a message identification apparatus, including:

a receiving module, configured to receive a paging message sent by an access network device;

a determining module, configured to determine a core network entity to which the paging message belongs in a plurality of core network entities serving the UE; and an establishment module, configured to establish a data connection to the core network entity to which the paging message belongs.

In a possible design, the plurality of core network entities are located in different network standards.

In a possible design, the paging message carries identification information, and the identification information is used to determine the core network entity to which the paging message belongs.

In a possible design, the identification information includes type identification information of the core network entity to which the paging message belongs.

In a possible design, the identification information includes device identification information of UE in the core network entity to which the paging message belongs.

In a possible design, the identification information includes a time-frequency resource corresponding to the core network entity to which the paging message belongs.

In a possible design, the establishment module is specifically configured to:

send the paging message to a NAS to which the paging message belongs;

receive a NAS message sent by the NAS; and send the NAS message to the core network entity to which the paging message belongs.

For beneficial effects of the message identification apparatus provided in the third aspect and the possible designs of the third aspect, refer to beneficial effects in the first aspect and the possible designs of the first aspect. Details are not described herein again.

According to a fourth aspect, an embodiment of this application provides a message identification apparatus, including:

a sending module, configured to send a paging message to user equipment UE;

a receiving module, configured to receive a NAS message sent by the UE based on the paging message; and a determining module, configured to determine a core network entity to which the NAS message belongs in a plurality of core network entities of the access network device, where the sending module is further configured to send the NAS message to the core network entity to which the NAS message belongs.

In a possible design, the determining module is specifically configured to:

receive a radio resource management RRC message sent by the UE, where the RRC message is used to transfer the NAS message, and the RRC includes a type identifier of the core network entity to which the NAS message belongs; and determine, based on the type identifier, the core network entity to which the NAS message belongs in the plurality of core network entities of the access network device.

In a possible design, the determining module is specifically configured to:

receive an RRC message, and determine a logical channel used when the RRC message is transferred, where the RRC message is used to transfer the NAS message; and determine, based on a mapping relationship between the logical channel and a core network entity, the core network entity corresponding to the logical channel.

For beneficial effects of the message identification apparatus provided in the fourth aspect and the possible designs of the fourth aspect, refer to beneficial effects in the second aspect and the possible designs of the second aspect. Details are not described herein again.

According to a fifth aspect, an embodiment of this application provides user equipment UE, including:
a receiver, configured to receive a paging message sent by an access network device; and
a processor, configured to determine a core network entity to which the paging message belongs in a plurality of core network entities serving the UE, where
the processor is configured to establish a data connection to the core network entity to which the paging message belongs.

In a possible design, the plurality of core network entities are located in different network standards.

In a possible design, the paging message carries identification information, and the identification information is used to determine the core network entity to which the paging message belongs.

In a possible design, the identification information includes type identification information of the core network entity to which the paging message belongs.

In a possible design, the identification information includes device identification information of UE in the core network entity to which the paging message belongs.

In a possible design, the identification information includes a time-frequency resource corresponding to the core network entity to which the paging message belongs.

In a possible design, the transmitter is further configured to send the paging message to a NAS to which the paging message belongs.

The receiver is further configured to receive a NAS message sent by the NAS.

The transmitter is further configured to send the NAS message to the core network entity to which the paging message belongs.

For beneficial effects of the UE provided in the fifth aspect and the possible designs of the fifth aspect, refer to beneficial effects in the first aspect and the possible designs of the first aspect. Details are not described herein again.

According to a sixth aspect, an embodiment of this application provides an access network device, including:
a transmitter, configured to send a paging message to user equipment UE;
a receiver, configured to receive a NAS message sent by the UE based on the paging message; and
a processor, configured to determine a core network entity to which the NAS message belongs in a plurality of core network entities of the access network device, where
the transmitter is further configured to send the NAS message to the core network entity to which the NAS message belongs.

In a possible design, the receiver is further configured to receive a radio resource management RRC message sent by the UE, where the RRC message is used to transfer the NAS message, and the RRC includes a type identifier of the core network entity to which the NAS message belongs.

The processor is further configured to determine, based on the type identifier, the core network entity to which the NAS message belongs in the plurality of core network entities of the access network device.

In a possible design, the receiver is further configured to receive an RRC message, where the RRC message is used to transfer the NAS message.

The processor is further configured to determine a logical channel used when the RRC message is transferred.

The processor is further configured to determine, based on a mapping relationship between the logical channel and a core network entity, the core network entity corresponding to the logical channel.

For beneficial effects of the access network device provided in the sixth aspect and the possible designs of the sixth aspect, refer to beneficial effects in the second aspect and the possible designs of the second aspect. Details are not described herein again.

DESCRIPTION OF EMBODIMENTS

The message identification method in the embodiments of this application may be applied to eLTE and 5G systems. A next generation core NG-Core is introduced into the eLTE and 5G systems. In an eLTE network architecture, for same UE, some services need to be transferred by using an EPC, and other services need to be transferred by using the NG-Core. In this case, the UE needs to access both the EPC and the NG-Core. Alternatively, for different UEs, some UEs need to connect to an EPC, and other UEs need to connect to the NG-Core. In a 5G network architecture, same UE may connect to a plurality of core network entities. For example, different services of same UE connect to different SM entities. Alternatively, same UE can connect to different network slices.

Therefore, the message identification method and apparatus, and the device provided in the embodiments of this application are intended to resolve the technical problem in the prior art that the UE cannot connect to different core network entities.

Specific embodiments are used below to describe in detail the technical solutions of this application. The following several specific embodiments may be combined with each other, and a same or similar concept or process may not be described repeatedly in some embodiments.

Figure 1:
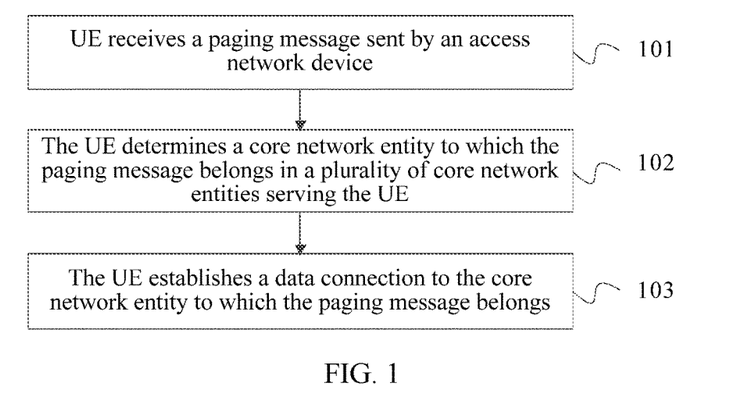
FIG. 1 is a schematic flowchart of Embodiment 1 of a message identification method according to an embodiment of this application.

FIG. 1 is a schematic flowchart of Embodiment 1 of a message identification method according to an embodiment of this application. As shown in FIG. 1, the method in this embodiment may include the following steps.

Step 101. UE receives a paging message sent by an access network device.

In this embodiment, it is assumed that the UE attaches to different core network entities. For example, the UE may attach to both an EPC and an NG-Core, or may attach to both an MM entity and an SM entity in an NG-Core, or may attach to a plurality of SM entities in an NG-Core, for example, attach to an SM entity 1 and an SM entity 2, or may attach to a plurality of network slices in an NG-Core, for example, attach to a network slice 1 and a network slice 2.

Figure 2:
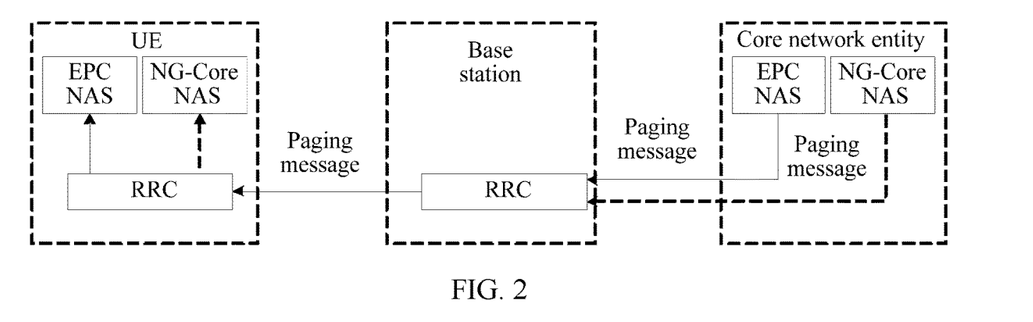
FIG. 2 is a schematic flowchart of sending a paging message.

FIG. 2 is a schematic flowchart of sending a paging message. As shown in FIG. 2, this embodiment is described by using an example in which the UE attaches to both an EPC and an NG-Core. When the UE is in an idle state, for a mobile terminating call, user data arrives at a core network, to be specific, the EPC and/or the NG-Core. After the user data arrives at a core network device, the core network device generates a paging message. For example, when the user data arrives at the EPC, the EPC generates an EPC paging message, and when the user data arrives at the NG-Core, the NG-Core generates an NG-Core paging message. Then, the core network device sends the paging message to a base station. The base station sends the received paging message to the UE by using a radio resource management (Radio Resource Control, RRC for short) layer. When the UE is in a third state, for the UE in the third state, user data directly arrives at a base station. After the user data arrives at the base station, the base station generates a paging message. When the user data arrives at the base station from the EPC, an EPC paging message is generated, and when the user data arrives at the NG-Core, an NG-Core paging message is generated. The third state means that a UE signaling link exists between the core network and the base station, and a connection between the UE and the base station is in a released state.

Step 102. The UE determines a core network entity to which the paging message belongs in a plurality of core network entities serving the UE.

In this embodiment, the core network entity may include a core network device and network slices in the core network device, for example, an EPC, an NG-Core, an SM entity, and an MM entity, or a plurality of network slices such as a network slice 1 and a network slice 2 in an NG-Core. After receiving the paging message sent by the access network device, the UE identifies a type of the paging message, that is, determines the core network entity to which the paging message belongs. For example, if the paging message is sent by the EPC, the type of the paging message is an EPC paging message, and the paging message belongs to the EPC. If the paging message is sent by the NG-Core, the type of the paging message is an NG-Core paging message, and the paging message belongs to the NG-Core. If the paging message is sent by an MM in the NG-Core, the type of the paging message is an MM paging message, and the paging message belongs to the MM. If the paging message is sent by an SM in the NG-Core, the type of the paging message is an SM paging message, and the paging message belongs to the SM. A type of a paging message sent by a network slice is similar to the type of the paging message sent by the core network device, and details are not described herein again.

In a specific implementation process, the UE may determine, by using identification information carried in the paging message, the core network entity to which the paging message belongs. Specifically, the core network entity to which the paging message belongs may be identified in the following several manners.

Manner 1: If the identification information includes type identification information of the core network entity to which the paging message belongs, the identifying the core network entity to which the paging message belongs includes: performing identification based on the type identification information.

Specifically, when sending a paging message, the access network device may add type identification information of a core network entity to the paging message, so that the UE identifies, based on the type identification information, a core network entity from which the paging message comes. In an actual application, this may be implemented in the following manner:

```
Paging ::=         SEQUENCE {
   paging-type              ENUMERATED {EPC, NG-Core},
   ...
}
``` where paging-type is an enumerated type, and a value of the enumerated type includes an EPC and an NG-Core. When the value of the enumerated type is an EPC, it indicates that the core network entity to which the paging message belongs is an EPC. When the value of the enumerated type is an NG-Core, it indicates that the core network entity to which the paging message belongs is an NG-Core.

Manner 2: If the identification information includes device identification information of UE in the core network entity to which the paging message belongs, the identifying the core network entity to which the paging message belongs includes: performing identification based on the device identification information of the UE.

Specifically, different core network entities may allocate different device identification information to the UE, and send the allocated device identification information to the UE by adding the allocated device identification information to a paging message. After receiving the paging message, the UE can identify, based on the device identification information, a core network entity from which the paging message comes. For example, in an initial attachment stage, the EPC allocates device identification information 1 to the UE, and the NG-Core allocates device identification information 2 to the UE. When data arrives at the EPC, the EPC delivers a paging message including the device identification information 1. When data arrives at the NG-Core, the NG-Core delivers a paging message including the device identification information 2. After the UE receives the paging message, if the paging message includes the device identification information 1, it indicates that the paging message is the paging message delivered by the EPC. In other words, the core network entity to which the paging message belongs is the EPC. If the paging message includes the device identification information, it indicates that the paging message is the paging message delivered by the NG-Core. In other words, the core network entity to which the paging message belongs is the NG-Core.

Manner 3: If the identification information includes a time-frequency resource corresponding to the core network entity to which the paging message belongs, the identifying the core network entity to which the paging message belongs includes: performing identification based on the time-frequency resource.

Specifically, the UE may distinguish types of different paging messages based on paging occasions for receiving the paging messages. The paging occasion refers to a time-frequency resource allocated by the access network device to the UE for receiving a paging message. For example, if a paging message detected by the UE at a paging occasion 1 is an EPC paging message, a core network entity to which the paging message detected at the paging occasion 1 belongs is the EPC; if a paging message detected by the UE at a paging occasion 2 is an NG-Core paging message, a core network entity to which the paging message detected at the paging occasion 2 belongs is the NG-Core, and so on.

Step 103. The UE establishes a data connection to the core network entity to which the paging message belongs.

In this embodiment, still referring to FIG. 2, after identifying the core network entity to which the paging message belongs, the UE sends, based on the type of the paging message, the paging message to a NAS to which the paging message belongs, so that the NAS initiates a corresponding service establishment procedure. For example, if the core network entity to which the paging message belongs is identified as the EPC, the paging message is sent to an EPC NAS; if the core network entity to which the paging message belongs is identified as the NG-Core, the paging message is sent to an NG-Core NAS, and so on. When the core network entity to which the paging message belongs is an SM or an MM, a sending manner is similar to the sending manner used when the core network entity to which the paging message belongs is the EPC or the NG-Core, and details are not described herein again. In addition, when the core network has a plurality of SM entities, the paging message may carry an SM entity identifier for generating the paging message; when the core network has a plurality of network slices, the paging message may carry a slice identifier for generating the paging message, and so on, to determine the core network entity to which the paging message belongs.

Figure 3:
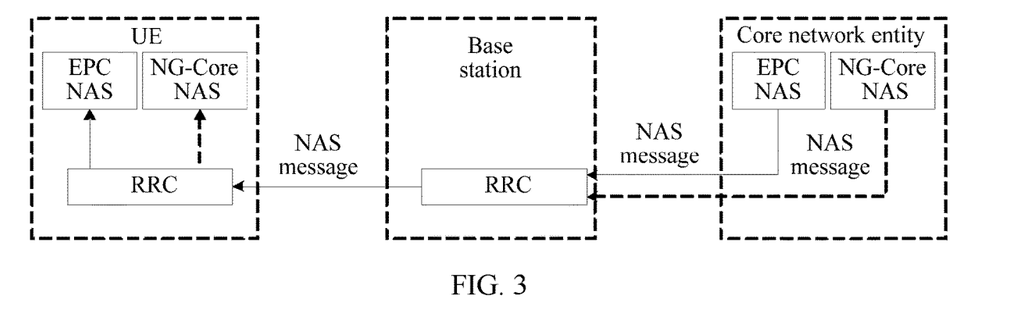
FIG. 3 is a schematic flowchart of sending a NAS message.

After delivering the paging message to the NAS to which the paging message belongs, the UE receives a NAS message sent by the NAS, and sends the NAS message to the access network device. The access network device identifies a type of the NAS message based on the received NAS message, that is, identifies a NAS sending the NAS message, and after the type is identified, sends the NAS message to a core network entity to which the NAS message belongs. FIG. 3 is a schematic flowchart of sending a NAS message. As shown in FIG. 3, this embodiment is described by using an example in which the type of the NAS message includes an EPC NAS and an NG-Core NAS. If identifying that the NAS message is sent by the EPC NAS, the network side device sends the NAS message to the EPC, and if identifying that the NAS message is sent by the NG-Core NAS, sends the NAS message to the NG-Core. In this embodiment, the method for identifying the NAS message, for example, in response to the paging message, is applicable to NAS message identification in all other cases, for example, identification of a service request message sent by the UE, an attachment message sent by the UE, or the like during a mobile originating call.

In a specific implementation process, for an uplink NAS message, the access network device may determine a core network entity to which the NAS message belongs in the following several manners.

Manner 1: The access network device receives an RRC message sent by the UE, where the RRC message is used to transfer the NAS message, the RRC includes a type identifier of the core network entity to which the NAS message belongs. The access network device determines, based on the type identifier, the core network entity to which the NAS message belongs.

Specifically, when this manner is used, there are two cases. In a first case, the access network device is a base station. Because the UE attaches to two different core network entities, a system includes two NASs. If the UE attaches to both the EPC and the NG-Core, the system includes an EPC NAS and an NG-Core NAS. If the UE attaches to both an MM entity and an SM entity, the system includes an MM NAS and an SM NAS. If the UE attaches to both an SM entity 1 and an SM entity 2, the system includes an SM1 NAS and an SM2 NAS. In addition, the NAS message is transferred between the UE and the base station by using the RRC message. Therefore, when sending the NAS message to the base station, the UE may add, to the RRC message, the type identifier of the core network entity to which the NAS message belongs. In this way, the base station can identify, based on the received type identifier, the core network entity to which the NAS message belongs. Using the EPC NAS and the NG-Core NAS as an example, in an actual application, this may be implemented in the following manner:

```
RRCMessage ::=  SEQUENCE {
    NASType         CHOICE {
        NASType1        EPC_NAS,
        NASType2        NG-Core NAS
    },
}
``` where when a value of NASType1 is EPC_NAS, it indicates that the core network entity to which the NAS message belongs is the EPC, or when a value of NASType1 is an NG-Core NAS, it indicates that the core network entity to which the NAS message belongs is the NG-Core. A value of NASType2 is similar to that of NASType1, and details are not described herein again.

Likewise, the core network entity to which the NAS belongs may distinguish the SM1 and the SM2 by using type identifiers of the SM entities, and the core network entity to which the NAS belongs may distinguish different network slices by using type identifiers of the network slices.

Figure 4:
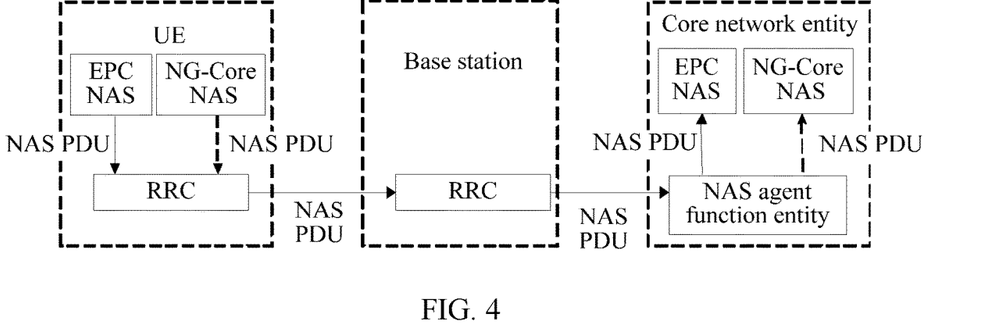
FIG. 4 is a schematic flowchart of transmitting a NAS message.

In a second case, the access network device is a core network entity. FIG. 4 is a schematic flowchart of transmitting a NAS message. As shown in FIG. 4, the core network entity to which the NAS message belongs is identified by a NAS agent function entity. The NAS agent function entity is a logical entity, and a physical location of the NAS agent function entity may be in a core network, or may be in a radio access network (Radio Access Network, RAN for short). When generating a NAS message, a NAS layer of the UE may add, to the NAS message, a type identifier of a core network entity to which the NAS message belongs. In a specific implementation process, the type identifier may be used as a part of the NAS Protocol Data Unit (Protocol Data Unit, PDU for short), and the NAS message is transmitted to the base station by using the RRC message. The base station sends the NAS message to the NAS agent function entity. The NAS agent function entity can identify, based on the type identifier in the NAS PDU, the core network entity to which the NAS message belongs.

Manner 2: An RRC message is received. A logical channel used when the RRC message is transferred is determined, where the RRC message is used to transfer the NAS message. A core network entity corresponding to the logical channel is determined based on a mapping relationship between the logical channel and the core network entity.

Specifically, in this identification method, the access side device may be, for example, a base station. Because the UE may send the NAS message to the base station by using different logical channels, when receiving the NAS message, the base station first needs to determine a logical channel entity sending the NAS message, where the logical channel entity is identified by a logical channel index (logical channel index, LCID for short), and determines, based on a prestored mapping relationship between the logical channel and a core network entity, the core network entity that corresponds to the logical channel and to which the NAS message belongs. For example, for RRC used to send an EPC NAS message, the UE may send the RRC by adding the RRC to a signaling radio bearer (signaling radio bearer, SRB for short) 1, and for RRC used to send an NG-Core NAS message, may send the RRC by adding the RRC to an SRB 2. After receiving the RRC message, the base station can determine, based on the mapping relationship between the logical channel and the core network entity, the core network entity to which the NAS message belongs. For example, when the base station configures the SRB 1, a dedicated LCID is allocated. When receiving the configuration, the UE establishes an entity corresponding to the SRB 1. When the UE sends the radio signaling bearer, an RRC layer generates the message, and delivers the message to a corresponding underlying entity. After receiving the message, a MAC entity fills the LCID into a MAC layer sub-header. When a MAC layer corresponding to the base station receives the LCD, the base station determines that the RRC message is the SRB 1.

In a specific implementation process, for a downlink NAS message, the UE may determine a core network entity to which the NAS message belongs in the following several manners.

Manner 1: The UE receives an RRC message sent by the access network device, where the RRC message is used to transfer the NAS message, the RRC includes a type identifier of the core network entity to which the NAS message belongs. The access network device determines, based on the type identifier, the core network entity to which the NAS message belongs.

Specifically, when this manner is used, there are two cases. In a first case, the access network device is a base station. Because the UE attaches to two different core network entities, a system includes two NASs. If the UE attaches to both the EPC and the NG-Core, the system includes an EPC NAS and an NG-Core NAS. If the UE attaches to both an MM entity and an SM entity, the system includes MM NAS and an SM NAS. If the UE attaches to both an SM entity 1 and an SM entity 2, the system includes an SM1 NAS and an SM2 NAS. In addition, the NAS message is transferred between the UE and the base station by using the RRC message. Therefore, when sending the NAS message to the UE, the base station may add, to the RRC message, the type identifier of the core network entity to which the NAS message belongs. In this way, the UE can identify, based on the received type identifier, the core network entity to which the NAS message belongs. Using the EPC NAS and the NG-Core NAS as an example, in an actual application, this may be implemented in the following manner:

```
RRCMessage ::=  SEQUENCE {
    NASType         CHOICE {
        NASType1        EPC_NAS,
        NASType2        NG-Core NAS
    },
}
``` where when a value of NASType1 is EPC_NAS, it indicates that the core network entity to which the NAS message belongs is the EPC, or when a value of NASType1 is an NG-Core NAS, it indicates that the core network entity to which the NAS message belongs is the NG-Core. A value of NASType2 is similar to that of NASType1, and details are not described herein again.

After identifying the core network entity to which the NAS message belongs, an RRC layer of the UE delivers the NAS message to the corresponding core network entity.

Figure 5:
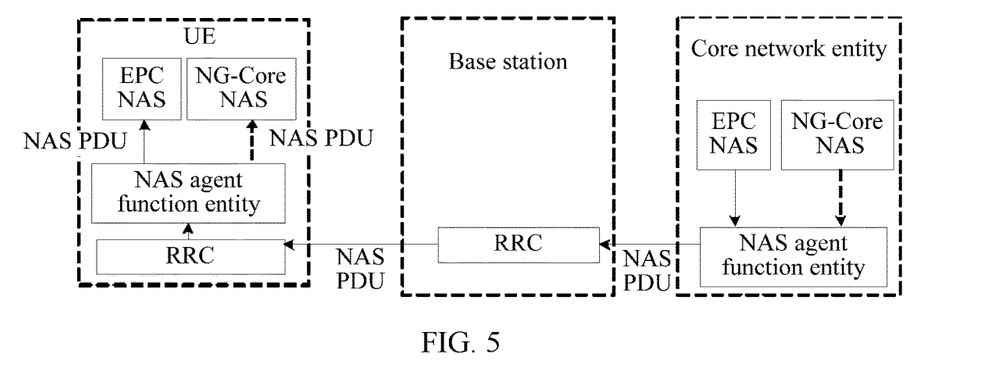
FIG. 5 is a schematic flowchart of transmitting a NAS message.

In a second case, FIG. 5 is a schematic flowchart of transmitting a NAS message. As shown in FIG. 5, in a downlink, a NAS agent function entity needs to be implemented on a UE side, to complete identification of the core network entity to which the NAS message belongs and delivery. When the core network device generates the NAS message, a NAS of the core network device may add, to the NAS message, the type identifier of the core network entity to which the NAS message belongs. Alternatively, a NAS agent function entity on a network side may add the type identifier. A specific manner of adding the type identifier is not limited in this embodiment. In a specific implementation process, the type identifier may be used as a part of the NAS PDU, and the NAS message is transmitted to the UE by using the RRC message. The RRC layer of the UE delivers the NAS PDU to the NAS agent function entity. The NAS agent function entity can identify, based on the type identifier in the NAS PDU, the core network entity to which the NAS message belongs, and then deliver the NAS message to a corresponding NAS layer.

Manner 2: An RRC message is received. A logical channel used when the RRC message is transferred is determined, where the RRC message is used to transfer the NAS message. A core network entity corresponding to the logical channel is determined based on a mapping relationship between the logical channel and the core network entity.

Specifically, in this identification method, the access side device may be, for example, a base station. Because the base station may send the NAS message to the UE by using different logical channels, when receiving the NAS message, the UE first needs to determine a logical channel entity sending the NAS message, where the logical channel entity is identified by an LCID, and determines, based on a prestored mapping relationship between the logical channel and a core network entity, the core network entity that corresponds to the logical channel and to which the NAS message belongs. For example, for RRC used to send an EPC NAS message, the base station may send the RRC by adding the RRC to an SRB 1, and for RRC used to send an NG-Core NAS message, may send the RRC by adding the RRC to an SRB 2. After receiving the RRC message, the UE can determine, based on the mapping relationship between the logical channel and the core network entity, the core network entity to which the NAS message belongs. For example, when the base station configures the SRB 1, a dedicated LCID is allocated. When receiving the configuration, the UE establishes an entity corresponding to the SRB 1. When the base station sends the radio signaling bearer, an RRC layer generates the message, and delivers the message to a corresponding underlying entity. After receiving the message, a MAC entity fills the LCID into a MAC layer sub-header. When a MAC layer corresponding to the UE receives the LCD, the UE determines that the RRC message is the SRB 1. After identifying the type of the NAS message, an RRC layer of the UE delivers the NAS message to a corresponding NAS entity.

It should be noted that this embodiment is merely described by using the paging message as an example. Actually, the manners provided in this embodiment may be used for NAS message identification in all scenarios in which a NAS message is used, for example, in a process of establishing a bearer between the UE and the network side device or in a process of information exchange between the UE and the core network device.

According to the message identification method provided in this embodiment of this application, the UE receives the paging message sent by the access network device, determines the core network entity to which the paging message belongs in the plurality of core network entities serving the UE, and establishes the data connection to the core network entity to which the paging message belongs. Because the UE can determine the core network entity to which the paging message belongs in the plurality of core network entities serving the UE, and establish the data connection to the core network entity to which the paging message belongs, the UE can be effectively supported in accessing different core network entities.

This embodiment provides another NAS message identification method. First, the UE or the core network selects a core network entity, and then the base station obtains information about the selected core network from the UE or the core network. For example, it is assumed that the selected core network entity is an EPC or an NG-Core. That the selected core network entity is an EPC or an NG-Core is notified to the base station by the UE by using an RRC message or by the core network by using an S1 message. In this case, for all NAS messages sent by the UE subsequently, the base station forwards the NAS messages to the EPC or the NG-Core. RRC of the UE also needs to learn of the selected core network entity. If the EPC is selected, the RRC layer of the UE delivers all received NAS messages to an EPC NAS entity of the UE. If the NG-Core is selected, the RRC layer of the UE delivers all received NAS messages to an NG-Core NAS entity of the UE. During a handover or when the UE moves, the information about the selected core network needs to be transferred between base stations, to enable the UE to move to a new base station. The base station may complete NAS message routing based on the information about the selected core network. For example, in a handover process, a source base station sends a handover request message to a target base station, the handover request message includes the information about the core network selected by the UE. The target base station completes NAS routing based on the information about the core network selected by the UE.

Optionally, the plurality of core network entities are located in different network standards. For example, the core network entity may include an EPC and an NG-Core, where the EPC is located in an LTE system, and the NG-Core is located in a 5G system.

Figure 6:
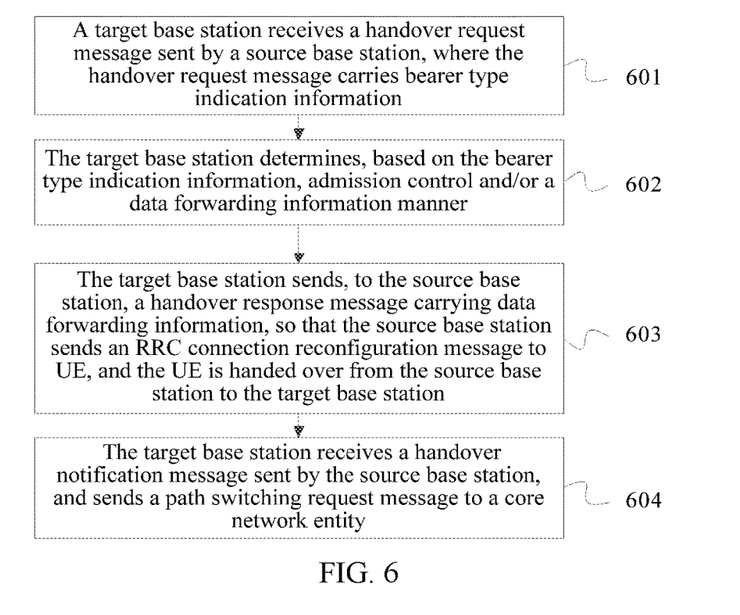
FIG. 6 is a schematic flowchart of Embodiment 2 of a message identification method according to an embodiment of this application.

FIG. 6 is a schematic flowchart of Embodiment 2 of a message identification method according to an embodiment of this application. This embodiment relates to a specific process about how UE is handed over from a source base station to a target base station after the UE connects to different core network entities. This embodiment is described by using an example in which the UE connects to both an EPC and an NG-Core. When the UE connects to an MM entity and an SM entity in an NG-Core or connects to a plurality of SM entities in an NG-Core, and when the UE connects to different network slices in an NG-Core, a manner of handing over the UE from a source base station to a target base station is similar to the handover manner used when the UE connects to both the EPC and the NG-Core, and therefore, details are not described again. As shown in FIG. 6, the method in this embodiment may include the following steps.

Step 601. The target base station receives a handover request message sent by the source base station, where the handover request message carries bearer type indication information.

Figure 7:
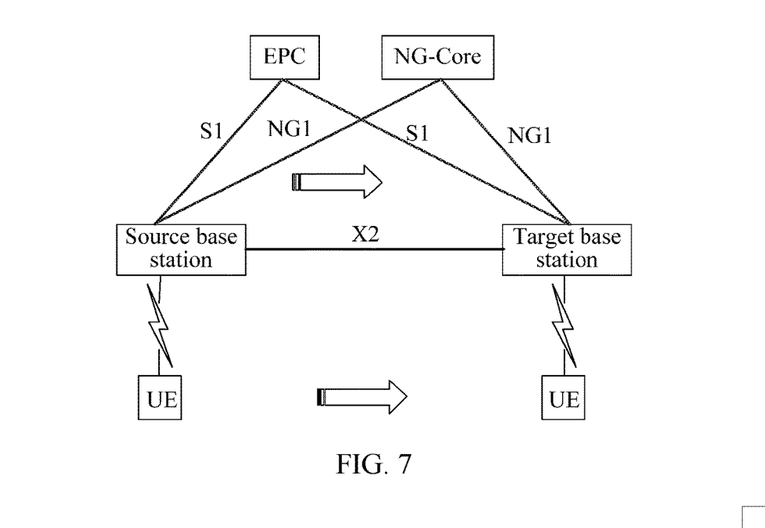
FIG. 7 is a schematic diagram of handing over UE from a source base station to a target base station.

In this embodiment, FIG. 7 is a schematic diagram of handing over UE from a source base station to a target base station. As shown in FIG. 7, the handover of the UE from the source base station to the target base station is a handover based on a direct interface (for example, X2) between the source base station and the target base station. In this handover process, because data arrives at the base station separately from the EPC and the NG-Core, when the UE moves to the target base station, a data path also needs to be switched from the EPC and the NG-Core to the target base station.

When a handover condition is satisfied, for example, when a measurement result received by the source base station satisfies a handover threshold, the source base station sends the handover request message to the target base station, where the handover request message includes the bearer type indication information, for example, whether a bearer is an EPC bearer or an NG-Core data flow. The bearer type indication information may alternatively be network slice information corresponding to the bearer or the data flow, or may be network entity information (for example, a corresponding SM entity) corresponding to the bearer or the data flow. The bearer type indication information is used to complete data forwarding and\or data path switching between the source base station and the target base station.

Figure 8:
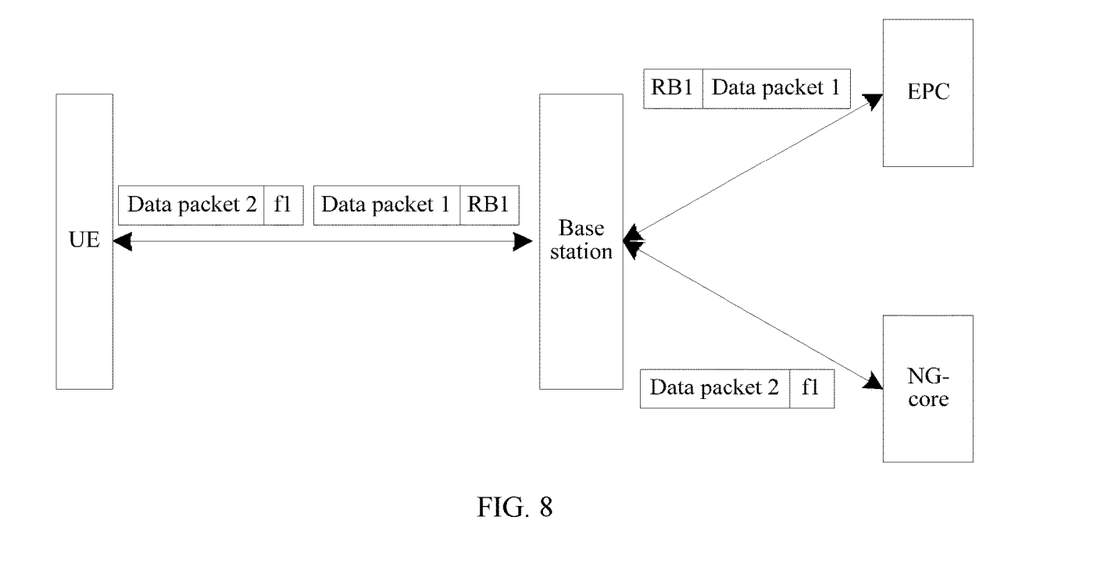
FIG. 8 is a first schematic diagram of a data bearer type.
Figure 9:
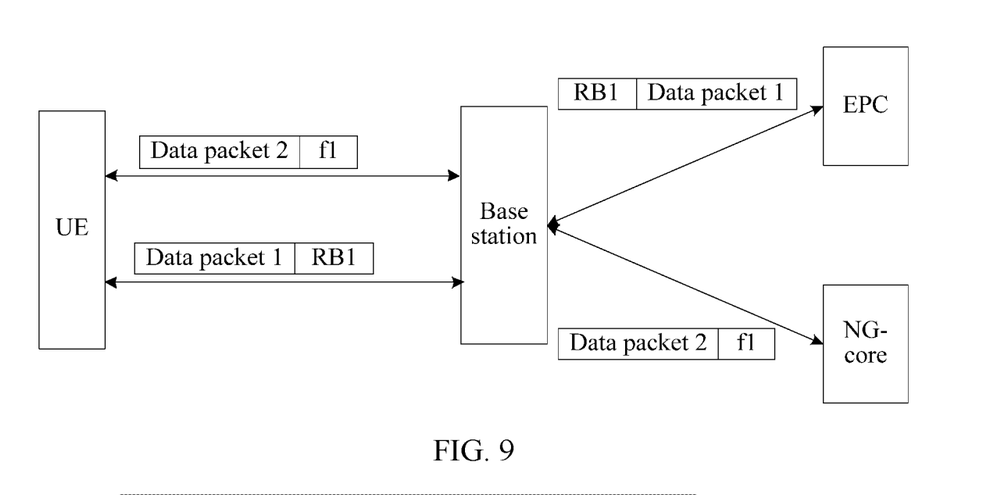
FIG. 9 is a second schematic diagram of a data bearer type.

Specifically, FIG. 8 is a first schematic diagram of a data bearer type, and FIG. 9 is a second schematic diagram of a data bearer type. As shown in FIG. 8, the EPC and the NG-Core separately transfer data by using different bearer types. For example, the EPC and the base station transfer data based on an existing bearer type, for example, RB 1, and the NG-Core and the base station transfer data based on a flow/flow, for example, f1. A person skilled in the art may understand that after the two bearer types are used, there are two possible manners on an air interface. Manner 1: As shown in FIG. 8, f1 and RB 1 share one DRB 1. In an uplink, if f1 and RB 1 share one DRB 1, the UE needs to add a data label when sending uplink data, so that the base station sends the data to a corresponding core network when receiving the data. The data label is used to identify f1 and RB 1. For example, data having a label of f1 is sent to the NG-Core, and data having a label of RB 1 is sent to the EPC. In a downlink, the base station maps the received data f1 and data RB 1 to a same air interface, namely, the DRB 1, for bearing. Manner 2: As shown in FIG. 9, f1 and RB 1 use different DRBs. In this case, the base station prestores a mapping relationship between the DRBs and f1 or RB 1. For example, a DRB 1 corresponds to RB 1, and a DRB 2 corresponds to f1. In this way, in a downlink, the base station sends data, received from the EPC, to the UE by using the DRB 1, and sends data, received from the NG-Core, to the UE by using the DRB 2. In an uplink, the base station sends data, received from the DRB 1, to the EPC, and sends data, received from the DRB 2, to the NG-Core.

For example, in Manner 1, the bearer type means that the source base station sends, to the target base station, an indication that the DRB 1 includes both f1 and RB 1, that is, includes both the EPC bearer RB 1 and the NG-Core data flow f1. In Manner 2, the bearer type is used to indicate that the DRB 1 corresponds to EPC RB 1 and that the DRB 2 corresponds to NG-Core f1, so that the target base station separately completes data forwarding and data path switching for the EPC bearer RB 1 and the NG-Core data flow f1.

Step 602. The target base station determines, based on the bearer type indication information, admission control and/or a data forwarding manner.

In this embodiment, after receiving the bearer type indication, the target base station determines a data forwarding method for the bearer. The data forwarding is performed to avoid a data loss in a handover process. The source base station needs to forward an unsuccessfully sent or to-be-transferred data packet to the target base station, so that the target base station completes further data transmission. Based on the bearer type indication information from the source base station, the target base station can determine a specific data forwarding manner, for example, setting a dedicated forwarding channel for f1 and RB 1. For example, the target base station allocates dedicated data forwarding information to f1, and allocates, to RB 1, dedicated data forwarding information including a target data forwarding address, where the target data forwarding address is allocated by the target base station. For example, based on a manner in the GPRS Tunneling Protocol (GPRS Tunneling Protocol, GTP for short), the data forwarding information includes a GTP tunnel endpoint identifier (Tunnel Endpoint Identifier, TEID for short) and an Internet Protocol (Internet Protocol, IP for short) address.

Step 603. The target base station sends, to the source base station, a handover response message carrying data forwarding information, so that the source base station sends an RRC connection reconfiguration message to the UE, and the UE is handed over from the source base station to the target base station.

In this embodiment, after receiving the bearer type indication information sent by the source base station, the target base station configures the bearer and determines to switch a path based on the bearer type indication information. For example, the target base station determines whether to transfer f1, RB 1, and the like in Manner 1 or Manner 2. After the configuration succeeds, the data forwarding information is carried in the handover response message and is sent to the source base station, so that the source base station learns that whether the data is to be forwarded based on f1 or RB 1.

After receiving the handover response message sent by the target base station, the source base station sends the RRC connection reconfiguration message to the UE. The UE is handed over from the source base station to the target base station, and performs a random access process, to complete a process of handover between base stations.

Step 604. The target base station receives a handover notification message sent by the source base station, and sends a path switching request message to a core network entity.

In this embodiment, after the UE is successfully handed over from the source base station to the target base station, the source base station sends the handover notification message to the target base station, so that the target base station learns that the handover process has been completed. In this case, the target base station sends the path switching request message to the core network entity, so that the core network entity switches a data transfer path. For example, the target base station sends the path switching request message to the EPC and the NG-Core separately. In this case, a data transfer path of RB 1 is switched from the source base station<->the EPC to the target base station<->the EPC, and a data transfer path of f1 is switched from the source base station<->the NG-Core to the target base station<->the NG-Core. The target base station releases an RB or a data flow for which path switching has not been completed.

According to the message identification method provided in this embodiment of this application, when the UE is handed over from the source base station to the target base station, the data transfer path may also be switched from a core network entity corresponding to the source base station to a core network entity corresponding to the target base station, thereby ensuring data transfer correctness.

Figure 10:
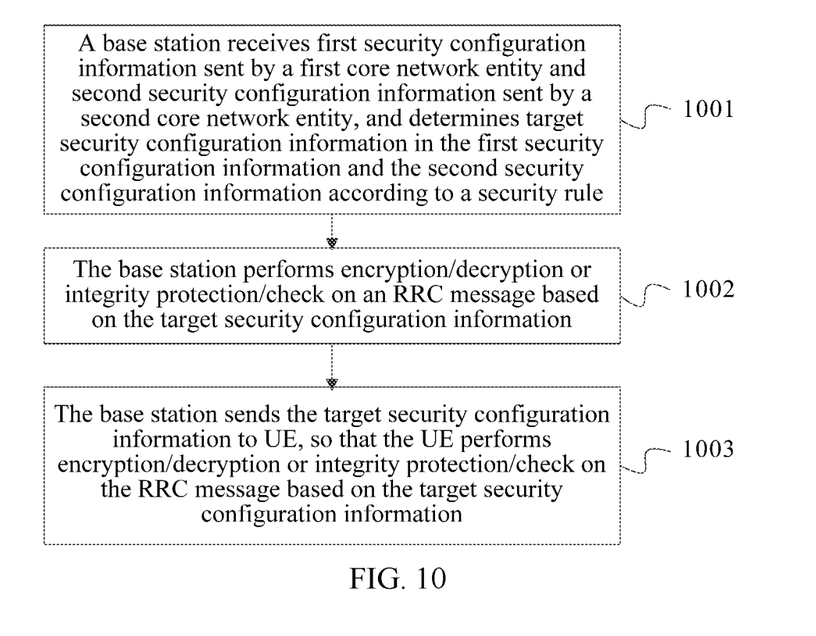
FIG. 10 is a schematic flowchart of Embodiment 3 of a message identification method according to an embodiment of this application.

FIG. 10 is a schematic flowchart of Embodiment 3 of a message identification method according to an embodiment of this application. This embodiment relates to a specific process about how a base station separately obtains, after UE connects to different core network entities and when the UE needs to complete authentication in the different core network entities, an air interface from the different core network entities to perform encryption/decryption. This embodiment is described by using an example in which the UE connects to both an EPC and an NG-Core. When the UE connects to different network slices, a manner of performing encryption/decryption by the base station is similar to an encryption/decryption manner used when the UE connects to both the EPC and the NG-Core, and therefore, details are not described again.

In this embodiment of this application, a transmit end may be the UE, the base station, or another communications device, and a receive end may be the UE, the base station, or another communications device. When the transmit end is the UE, the receive end may be the base station. When the transmit end is the base station, the receive end may be the UE. In conclusion, specific forms of the transmit end and the receive end are not limited in this embodiment of this application.

As shown in FIG. 10, the method in this embodiment may include the following steps.

Step 1001. The base station receives first security configuration information sent by a first core network entity and second security configuration information sent by a second core network entity, and determines target security configuration information in the first security configuration information and the second security configuration information according to a security rule.

In this embodiment, because the UE accesses different core network entities, for example, the EPC and the NG-Core, the UE may need to complete authentication in both the EPC and the NG-Core. In this way, the base station may separately obtain an air interface from the EPC and the NG-Core to complete a security configuration of encryption/decryption or integrity protection/check. In this embodiment, because there is only one RRC, the base station and the UE need to agree on a security configuration used for the RRC, so that a receiver can use a correct security configuration to complete decryption and integrity check. The security configuration information may include a security algorithm, a security key, and the like.

After receiving first security configuration information sent by the EPC and second security configuration information sent by the NG-Core, the base station may determine target security configuration information in the first security configuration information and the second security configuration information according to the following several security rules: (1) The first security configuration information sent by the EPC is used as the target security configuration information. (2) The second security configuration information sent by the NG-Core is used as the target security configuration information. (3) The last obtained security configuration information is used as the target security configuration information. (4) The initially obtained security configuration information is used as the target security configuration information.

Step 1002. The base station performs encryption/decryption or integrity protection/check on an RRC message based on the target security configuration information.

In this embodiment, after determining the target security configuration information, the base station performs encryption/decryption or integrity protection/check on the RRC message based on the target security configuration information.

Step 1003. The base station sends the target security configuration information to the UE, so that the UE performs encryption/decryption or integrity protection/check on the RRC message based on the target security configuration information.

In this embodiment, the base station needs to indicate the determined target security configuration information to the UE, so that the UE and the base station use the same security configuration information. It should be noted that if the base station updates the determined security configuration information, the base station also needs to indicate updated security configuration information to the UE.

It should be noted that alternatively, the UE may determine the target security configuration information in the first security configuration information and the second security configuration information according to the security rule and based on the first security configuration information and the second security configuration information respectively sent by the first core network entity and the second core network entity, and send the determined target security configuration information to the base station.

According to the message identification method provided in this embodiment of this application, the base station determines the target security configuration information based on security configuration information sent by different core network entities, and sends the target security configuration message to the UE, so that the UE and the base station use the same security configuration information to perform encryption/decryption or integrity protection/check on the RRC message, thereby ensuring security of the RRC message.

Figure 11:
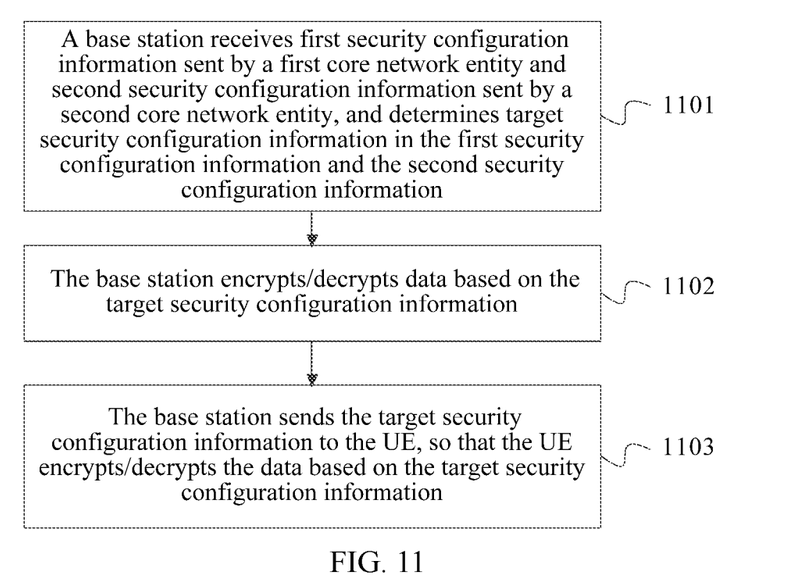
FIG. 11 is a schematic flowchart of Embodiment 4 of a message identification method according to an embodiment of this application.

FIG. 11 is a schematic flowchart of Embodiment 4 of a message identification method according to an embodiment of this application. This embodiment relates to a specific process about how a base station selects security configuration information to encrypt data after UE connects to different core network entities. This embodiment is described by using an example in which the UE connects to both an EPC and an NG-Core. When the UE connects to different network slices, a manner of encrypting the data by the base station is similar to a data encryption manner used when the UE connects to both the EPC and the NG-Core, and therefore, details are not described again.

In this embodiment of this application, a transmit end may be the UE, the base station, or another communications device, and a receive end may be the UE, the base station, or another communications device. When the transmit end is the UE, the receive end may be the base station. When the transmit end is the base station, the receive end may be the UE. In conclusion, specific forms of the transmit end and the receive end are not limited in this embodiment of this application.

As shown in FIG. 11, the method in this embodiment may include the following steps.

Step 1101. The base station receives first security configuration information sent by a first core network entity and second security configuration information sent by a second core network entity, and determines target security configuration information in the first security configuration information and the second security configuration information.

This embodiment is described by using an example in which the first core network entity is the EPC and the second core network entity is the NG-Core. The EPC and the base station transfer data based on an existing bearer, for example, an RB 1. The NG-Core and the base station transfer data based on a flow/flow, for example, a flow 1. Therefore, the target security configuration information is determined in the following two manners: Manner 1: The flow 1 and the RB 1 share one DRB 1. In this case, the base station needs to select corresponding security configuration information according to a security rule, where the security rule is the same as the security rule in step 1001, and details are not described herein again. Manner 2: The flow 1 and the RB 1 use different DRBs. In this case, different security configuration information may be used. For example, a DRB 1 corresponding to the flow 1 uses NG-Core security configuration information, and a DRB 2 corresponding to the RB 1 uses EPC security configuration information.

Step 1102. The base station encrypts/decrypts data based on the target security configuration information.

Step 1103. The base station sends the target security configuration information to the UE, so that the UE encrypts/decrypts the data based on the target security configuration information.

In this embodiment, the base station encrypts the data based on the determined target security configuration information, and sends the target security configuration information to the UE, so that the UE encrypts/decrypts the data by using the same security configuration information as the base station.

According to the message identification method provided in this embodiment of this application, the base station determines the target security configuration information based on security configuration information sent by different core network entities, and sends the target security configuration message to the UE, so that the UE and the base station use the same security configuration information to encrypt/decrypt the data, thereby ensuring data security.

Optionally, based on any one of the foregoing embodiments, if dual NASs correspond to different RRCs, that is, there are dual NASs and dual RRCs, because the RRC is independent, during identification of a NAS message, identification of a paging message, and selection of the target security configuration information, the NAS only needs to send the message to a corresponding RRC layer for processing.

Figure 12:
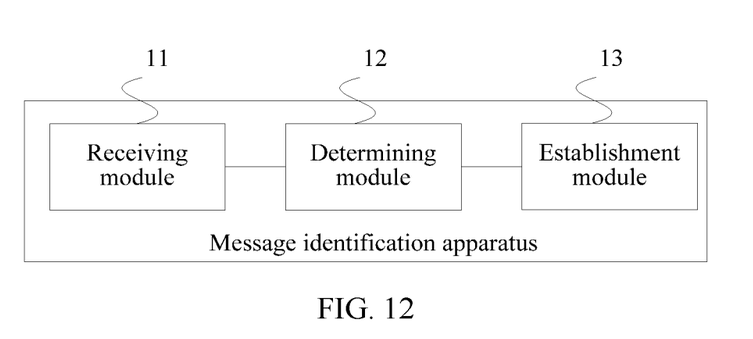
FIG. 12 is a schematic structural diagram of Embodiment 1 of a message identification apparatus according to an embodiment of this application.

FIG. 12 is a schematic structural diagram of Embodiment 1 of a message identification apparatus according to an embodiment of this application. The identification apparatus may be independent UE, or may be an apparatus integrated into UE. The apparatus may be implemented by software, hardware, or a combination of software and hardware. As shown in FIG. 12, the identification apparatus includes:

a receiving module 11, configured to receive a paging message sent by an access network device;
a determining module 12, configured to determine a core network entity to which the paging message belongs in a plurality of core network entities serving the UE; and
an establishment module 13, configured to establish a data connection to the core network entity to which the paging message belongs.

Optionally, the receiving module 11 may be correspondingly a receiver in the UE, and the determining module 12 and the establishment module 13 may be correspondingly a processor in the UE, or the receiving module 11 may integrate some functions of the processor.

The message identification apparatus provided in this embodiment of this application may perform the foregoing method embodiments. Their implementation principles and technical effects are similar, and details are not described herein again.

Optionally, the plurality of core network entities are located in different network standards.

Optionally, the paging message carries identification information, and the identification information is used to determine the core network entity to which the paging message belongs.

Optionally, the identification information includes type identification information of the core network entity to which the paging message belongs.

Optionally, the identification information includes device identification information of UE in the core network entity to which the paging message belongs.

Optionally, the identification information includes a time-frequency resource corresponding to the core network entity to which the paging message belongs.

Optionally, the establishment module 13 is specifically configured to:
send the paging message to a NAS to which the paging message belongs;
receive a NAS message sent by the NAS; and
send the NAS message to the core network entity to which the paging message belongs.

The message identification apparatus provided in this embodiment of this application may perform the foregoing method embodiments. Their implementation principles and technical effects are similar, and details are not described herein again.

Figure 13:
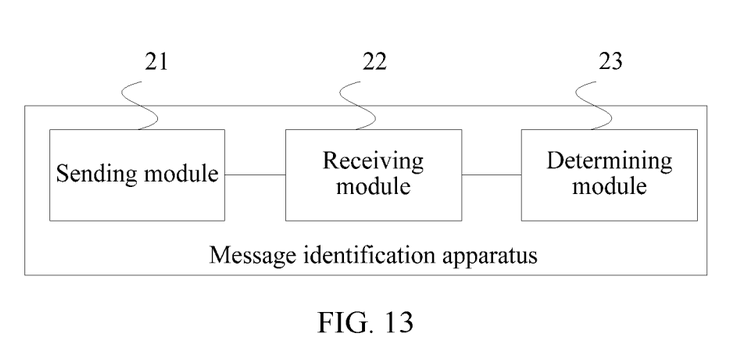
FIG. 13 is a schematic structural diagram of Embodiment 2 of a message identification apparatus according to an embodiment of this application.

FIG. 13 is a schematic structural diagram of Embodiment 2 of a message identification apparatus according to an embodiment of this application. The identification apparatus may be an independent access network device, or may be an apparatus integrated into an access network device. The apparatus may be implemented by software, hardware, or a combination of software and hardware. As shown in FIG. 13, the identification apparatus includes:

a sending module 21, configured to send a paging message to user equipment UE, so that the UE identifies a type of the paging message;
a receiving module 22, configured to receive a NAS message sent by the UE based on the paging message; and
a determining module 23, configured to determine a core network entity to which the NAS message belongs in a plurality of core network entities of the access network device.

The sending module 21 is further configured to send the NAS message to the core network entity to which the NAS message belongs.

Optionally, the sending module 21 may be a transmitter in the access network device, the receiving module 22 may be correspondingly a receiver in the access network device, and the determining module 23 may be correspondingly a processor in the access network device, or the sending module 21 and the receiving module 22 may integrate some functions of the processor.

The message identification apparatus provided in this embodiment of this application may perform the foregoing method embodiments. Their implementation principles and technical effects are similar, and details are not described herein again.

Optionally, the determining module 23 is specifically configured to:
receive a radio resource management RRC message sent by the UE, where the RRC message is used to transfer the NAS message, and the RRC includes a type identifier of the core network entity to which the NAS message belongs; and
determine, based on the type identifier, the core network entity to which the NAS message belongs in the plurality of core network entities of the access network device.

Optionally, the determining module 23 is specifically configured to:
receive an RRC message, and determine a logical channel used when the RRC message is transferred, where the RRC message is used to transfer the NAS message; and
determine, based on a mapping relationship between the logical channel and a core network entity, the core network entity corresponding to the logical channel.

The message identification apparatus provided in this embodiment of this application may perform the foregoing method embodiments. Their implementation principles and technical effects are similar, and details are not described herein again.

Figure 14:
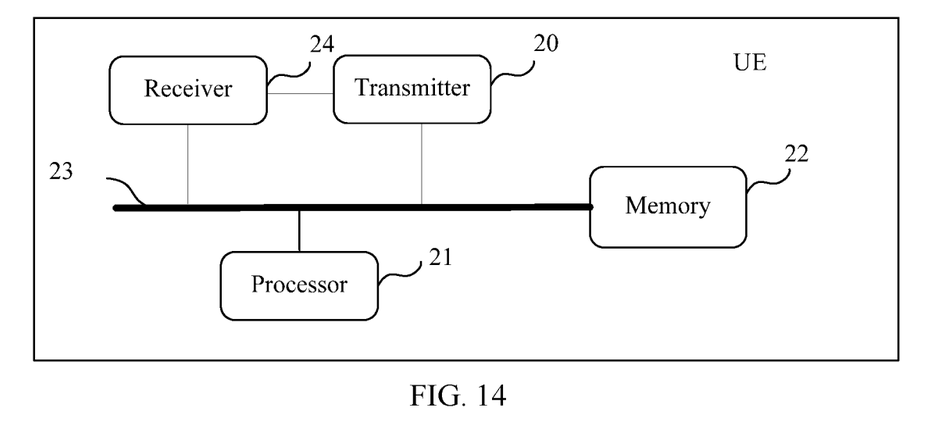
FIG. 14 is a schematic structural diagram of an embodiment of UE according to an embodiment of this application.

FIG. 14 is a schematic structural diagram of an embodiment of UE according to an embodiment of this application. As shown in FIG. 14, the UE may include a transmitter 20, a processor 21, a memory 22, and at least one communications bus 23. The communications bus 23 is configured to implement communication and connection between components. The memory 22 may include a high-speed RAM memory 22, or may further include a non-volatile memory NVM, for example, at least one magnetic disk memory 22. The memory 22 may store various programs, to perform various processing functions and implement method steps in the embodiments. In addition, the UE may further include a receiver 24. The receiver 24 in this embodiment may be correspondingly an input interface having a communication function and an information receiving function, or may be a radio frequency module or a baseband module in the UE. The transmitter 20 in this embodiment may be correspondingly an output interface having a communication function and an information sending function, or may be a radio frequency module or a baseband module in the UE. Optionally, the transmitter 20 and the receiver 24 may be integrated into one UE, or may be two independent communications interfaces.

In this embodiment, the receiver 24 is configured to receive a paging message sent by an access network device.

The processor 21 is configured to determine a core network entity to which the paging message belongs in a plurality of core network entities serving the UE.

The processor 21 is configured to establish a data connection to the core network entity to which the paging message belongs.

Optionally, the plurality of core network entities are located in different network standards.

Optionally, the paging message carries identification information, and the identification information is used to determine the core network entity to which the paging message belongs.

Optionally, the identification information includes type identification information of the core network entity to which the paging message belongs.

Optionally, the identification information includes device identification information of UE in the core network entity to which the paging message belongs.

Optionally, the identification information includes a time-frequency resource corresponding to the core network entity to which the paging message belongs.

Optionally, the transmitter 20 is configured to send the paging message to a NAS to which the paging message belongs.

The receiver 24 is configured to receive a NAS message sent by the NAS.

The transmitter 20 is configured to send the NAS message to the core network entity to which the paging message belongs.

The UE provided in this embodiment of this application may perform the foregoing method embodiments. Their implementation principles and technical effects are similar, and details are not described herein again.

Figure 15:
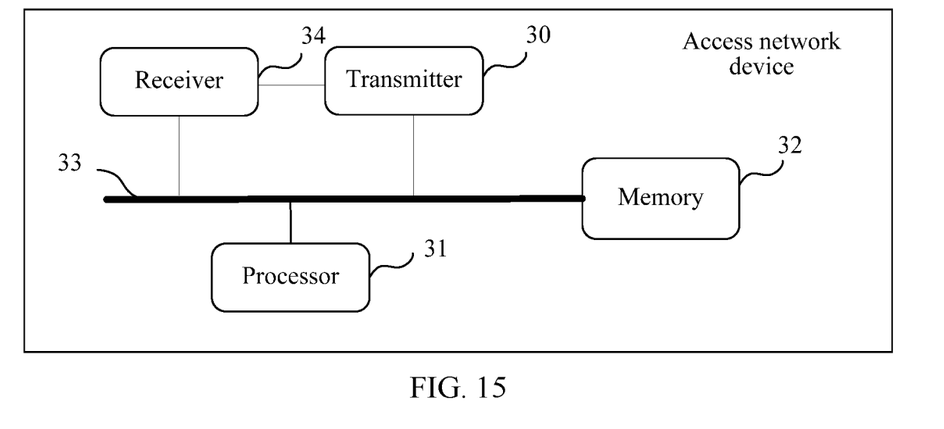
FIG. 15 is a schematic structural diagram of an embodiment of a network side device according to an embodiment of this application.

FIG. 15 is a schematic structural diagram of an embodiment of an access network device according to an embodiment of this application. As shown in FIG. 15, the access network device may include a transmitter 30, a processor 31, a memory 32, and at least one communications bus 33. The communications bus 33 is configured to implement communication and connection between components. The memory 32 may include a high-speed RAM memory 32, or may further include a non-volatile memory NVM, for example, at least one magnetic disk memory 32. The memory 32 may store various programs, to perform various processing functions and implement method steps in the embodiments. In addition, the access network device may further include a receiver 34. The receiver 34 in this embodiment may be correspondingly an input interface having a communication function and an information receiving function, or may be a radio frequency module or a baseband module in the access network device. The transmitter 30 in this embodiment may be correspondingly an output interface having a communication function and an information sending function, or may be a radio frequency module or a baseband module in the access network device. Optionally, the transmitter 30 and the receiver 34 may be integrated into one network side device, or may be two independent communications interfaces.

In this embodiment, the transmitter 30 is configured to send a paging message to user equipment UE.

The receiver 34 is configured to receive a NAS message sent by the UE based on the paging message.

The processor 31 is configured to determine a core network entity to which the NAS message belongs in a plurality of core network entities of the access network device.

The transmitter 30 is further configured to send the NAS message to the core network entity to which the NAS message belongs.

Optionally, the receiver 34 is further configured to receive a radio resource management RRC message sent by the UE, where the RRC message is used to transfer the NAS message, and the RRC includes a type identifier of the core network entity to which the NAS message belongs.

The processor 31 is further configured to determine, based on the type identifier, the core network entity to which the NAS message belongs in the plurality of core network entities of the access network device.

Optionally, the receiver 34 is further configured to receive an RRC message, where the RRC message is used to transfer the NAS message.

The processor 31 is further configured to determine a logical channel used when the RRC message is transferred. The processor 31 is further configured to determine, based on a mapping relationship between the logical channel and a core network entity, the core network entity corresponding to the logical channel.

The access network device provided in this embodiment of this application may perform the foregoing method embodiments. Their implementation principles and technical effects are similar, and details are not described herein again.

What is claimed is:

1. A method of message identification, comprising:
receiving, by a user equipment (UE), a paging message from an access network device at a paging occasion, wherein the paging occasion corresponds to a time-frequency resource;
identifying, by the UE, based on the time-frequency resource, a core network entity to which the paging message belongs, wherein identifying the core network entity to which the paging message belongs based on the time-frequency resource comprises:
distinguishing between whether the paging message belongs to an Evolved Packet Core (EPC) network entity and whether the paging message belongs to a Next Generation Core (NG-Core) network entity based on whether the paging message was received at a first paging occasion corresponding to the EPC network entity or whether the paging message was received at a second paging occasion corresponding to the NG-Core network entity, respectively, wherein in case that the paging message was received at the first paging occasion corresponding to the EPC network entity, the identified core network entity is the EPC network entity, and in case that the paging message was received at the second paging occasion corresponding to the NG-Core network entity, the identified core network entity is the NG-Core network entity; and
establishing, by the UE, a data connection to the core network entity to which the paging message belongs.

2. The method according to claim 1, wherein the EPC network entity and the NG-Core network entity are located in different systems corresponding to different network standards.

3. The method according to claim 1, wherein establishing the data connection to the core network entity to which the paging message belongs comprises:

sending, by the UE, the paging message to a non-access stratum (NAS) to which the paging message belongs;
receiving, by the UE, an NAS message from the NAS; and
sending, by the UE, the NAS message to the core network entity to which the paging message belongs.

4. A message identification apparatus, comprising:
a non-transitory memory having instructions stored thereon; and
a processor configured to execute the instructions, wherein execution of the instructions by the processor facilitates the following being performed by the message identification apparatus:
receiving a paging message from an access network device at a paging occasion, wherein the paging occasion corresponds to a time-frequency resource;
identifying, based on the time-frequency resource, a core network entity to which the paging message belongs, wherein identifying the core network entity to which the paging message belongs based on the time-frequency resource comprises: distinguishing between whether the paging message belongs to an Evolved Packet Core (EPC) network entity and whether the paging message belongs to a Next Generation Core (NG-Core) network entity based on whether the paging message was received at a first paging occasion corresponding to the EPC network entity or whether the paging message was received at a second paging occasion corresponding to the NG-Core network entity, respectively, wherein in case that the paging message was received at the first paging occasion corresponding to the EPC network entity, the identified core network entity is the EPC network entity, and in case that the paging message was received at the second paging occasion corresponding to the NG-Core network entity, the identified core network entity is the NG-Core network entity; and
establishing a data connection to the core network entity to which the paging message belongs.

5. The apparatus according to claim 4, wherein the EPC network entity and the NG-Core network entity are located in different systems corresponding to different network standards.

6. The apparatus according to claim 4, wherein execution of the instructions by the processor further facilitates the following being performed by the message identification apparatus:
sending the paging message to a non-access stratum (NAS) to which the paging message belongs;
receiving an NAS message from the NAS; and
sending the NAS message to the core network entity to which the paging message belongs.

7. A system, comprising:
a user equipment (UE); and
an access network device;
wherein the UE is configured to:
receive a paging message from the access network device at a paging occasion, wherein the paging occasion corresponds to a time-frequency resource; and
identify, based on the time-frequency resource, a core network entity to which the paging message belongs, wherein identifying the core network entity to which the paging message belongs based on the time-frequency resource comprises: distinguishing between whether the paging message belongs to an Evolved Packet Core (EPC) network entity and whether the paging message belongs to a Next Generation Core (NG-Core) network entity based on whether the paging message was received at a first paging occasion corresponding to the EPC network entity or whether the paging message was received at a second paging occasion corresponding to the NG-Core network entity, respectively, wherein in case that the paging message was received at the first paging occasion corresponding to the EPC network entity, the identified core network entity is the EPC network entity, and in case that the paging message was received at the second paging occasion corresponding to the NG-Core network entity, the identified core network entity is the NG-Core network entity; and
wherein the access network device is configured to:
allocate, based on the core network entity to which the paging message belongs, the time-frequency resource to the UE for receiving the paging message;
send the paging message to the UE on the allocated time-frequency resource;
receive a non-access stratum (NAS) message from the UE based on the paging message;
determine a core network entity associated with the NAS message out of a plurality of core network entities of the access network device; and
send the NAS message to the core network entity associated with the NAS message.

8. The system according to claim 7, wherein the access network device is further configured to:
receive, from the UE, a radio resource control (RRC) message for transferring the NAS message, wherein the RRC message comprises a type identifier of the core network entity associated with the NAS message; and
determine, based on the type identifier, the core network entity associated with the NAS message out of the plurality of core network entities of the access network device.

9. The system according to claim 7, wherein the access network device is further configured to:
receive a radio resource control (RRC) message for transferring the NAS message, and determine a logical channel used when the RRC message is transferred; and
determine a core network entity corresponding to the logical channel based on a mapping relationship between the logical channel and the core network entity.

* * * * *